July 11, 1961 V. G. BELL, JR 2,991,843
VENTILATOR CONSTRUCTION
Filed Dec. 30, 1958
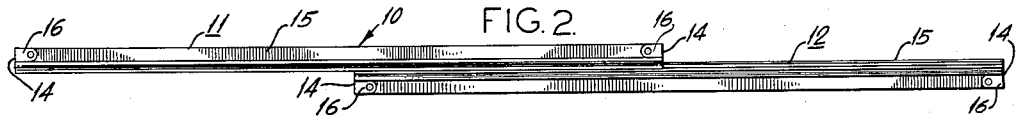
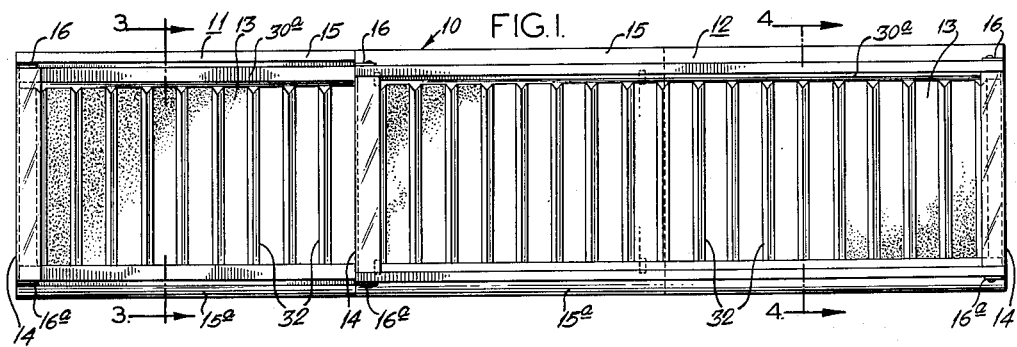
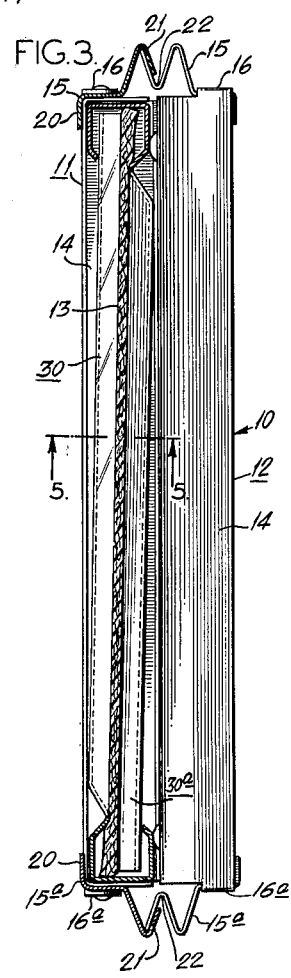
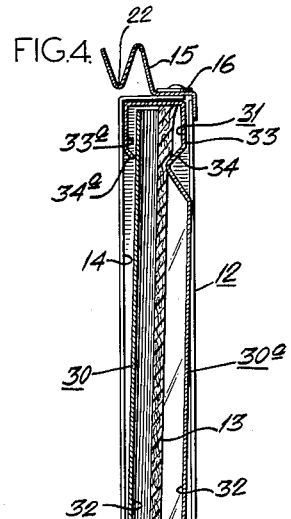
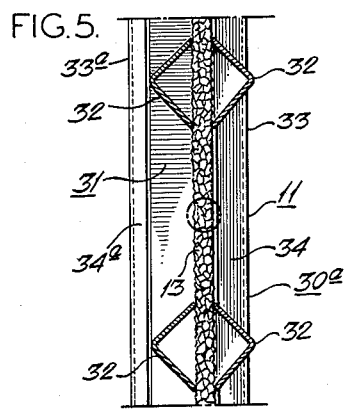
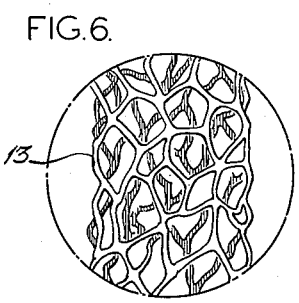
INVENTOR:
VINCENT G. BELL JR
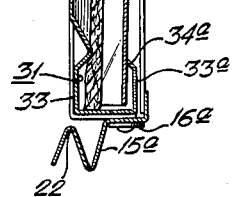
ATTYS.

United States Patent Office 2,991,843
Patented July 11, 1961

2,991,843
VENTILATOR CONSTRUCTION
Vincent G. Bell, Jr., Wayne, Pa., assignor to Safeguard Corporation, Lansdale, Pa., a corporation of Delaware
Filed Dec. 30, 1958, Ser. No. 783,861
3 Claims. (Cl. 183—51)

The present invention relates generally to ventilators that are adapted to be removably positioned above and/or beneath vertically movable sash in windows, and more particularly to improvements in apparatus of this type wherein the combined features of a ventilator and a filter are provided.

Conventional type ventilators heretofore used comprised generally a metal screen mounted in a wood frame or the like. Such screening while serving as a ventilator has not been effective in preventing drafts or shutting out dirt, pollen, rain, snow and other foreign matter in the atmosphere.

The present invention overcomes drawbacks in prior apparatus by effectively combining the features of a filter and a ventilator in a light weight, easily assembled and durable device. The apparatus of the present invention comprises briefly a filter member consisting of a permeable polymeric material, resiliently held in place in a sturdily constructed frame by a novel supporting structure.

A preferred type of permeable polymeric material especially suited for purposes of the present invention is a polyurethane foam having a three dimensional skeletal structure (sold under the trade name Scottfoam by the Scott Paper Company). The completely open pore structure of the material insures a steady flow of draft free, clean air therethrough, while the tortuous paths defined by the random oriented skeletal strands preclude passage of air-borne dirt and pollen, and also rain and snow. Other characteristics that distinguish this material from other permeable polymeric materials are high tensile strength and chemical resistance to water, soaps and detergents. Accordingly the filter media may be cleaned from time to time by a simple rinsing operation under running water without deleteriously affecting the characteristics that make it desirable as a filter.

With the foregoing in mind an object of the present invention is to provide a new and improved ventilator adapted to be removably positioned in a window opening which combines the features of a filter and a ventilator in apparatus having simple construction and durability.

Another object of the invention is to provide a novel mounting structure for resiliently maintaining a sheet of permeable polymeric material in place.

These and other objects of the present invention and the various features and details of the operation and construction thereof are hereinafter more fully set forth and described with reference to the accompanying drawings, in which:

FIG. 1 is an elevational view of the window filter-ventilator of the present invention;

FIG. 2 is a top view of the apparatus of FIG. 1;

FIG. 3 is an enlarged sectional view taken along line 3—3 of FIG. 1;

FIG. 4 is an enlarged sectional view taken along line 4—4 of FIG. 1;

FIG. 5 is an enlarged fragmentary view taken along line 5—5 of FIG. 3; and

FIG. 6 is a view of the structure of the filter media set out in the encircled portion of FIG. 5.

Referring more specifically to the drawings and particularly to FIG. 1 thereof, reference numeral 10 designates generally a combined filter and ventilator constructed in accordance with the present invention. The apparatus comprises, as shown in FIGS. 1 and 2, a pair of ventilator sections 11 and 12 which are slidably interconnected to permit longitudinal movement of one with respect to the other and thereby provide a means for removably positioning the sections within window openings of various sizes, and a filter media consisting of a sheet of a permeable polymeric material 13 resiliently supported in each ventilator section.

Each ventilator section comprises end frame member 14 of generally U-shaped cross section and parallel upper and lower frame members 15, 15a secured to the end frame members at their outer extremities to form a generally rectangular supporting frame. Tab portions 16, 16a may be formed as extensions of the end frame members 14 to receive and support opposite end portions of the upper and lower frame members 15, 15a and may be secured thereto in a suitable manner, as for example, a riveted connection.

The upper and lower frame members 15, 15a are provided with track members including angularly disposed coating surfaces to interconnect the ventilator sections for longitudinal sliding movement of one with respect to the other. To this end the upper and lower frame members 15, 15a of ventilator section 11 have means for interconnecting the sections 11 and 12 including a longitudinally extending relatively shallow flange 20 upon one side while the opposite side of said member is provided with a single outwardly and angularly reversely turned or V-shaped tongue portion 21, which slides in the groove of a complementary Z-shaped portion 22 of the frame members of ventilator section 12.

In accordance with the present invention, means are provided to resiliently support the filter media in place in the ventilator sections. To this end a pair of finger type frame members 30, 30a are provided. Each frame member 30, 30a comprises a generally U-shaped channel section 31 and a plurality of spaced fingers 32, 32 extending from a leg 33 of the channel section 31. The leg portions 33, 33a of the channel section 31 are crimped or bent inwardly towards one another to form oppositely facing flange portions 34, 34a as illustrated in FIGS. 3 and 4, the purpose of which will be subsequently explained. The finger portions 32, 32 are formed integrally with a leg portion 33 of the channel section and may be V-shaped as illustrated in FIG. 5. A pair of finger frames 30, 30a are mounted in each ventilator section in opposing relationship to one another with the channel sections thereof lying adjacent the upper and lower frame members of the ventlator section. The finger frames 30, 30a are retained in this position by engagement within the U-shaped end frame members. With reference to FIGS. 3 and 4, it may be seen that the finger members of opposing finger frames extend into the chanel section of the other finger frame with the outer portion of the fingers in engagement with the inturned flange portion. When the structure is assembled, as described, the sheet of permeable polymeric material is resiliently supported in place between and by means of the interlocking relationship of the finger frames.

FIG. 6 shows an enlarged section of the structure of a preferred type of permeable polymeric material adapted to be used as a filter media. In the three dimensionally reticulated structure of this skeletonized polymeric foam (Scottfoam), the polymer strands intersect in a non-planar configuration. Structurally, this material has advantages when used as a filter media over open cell polymeric foams which are composed of strands connected by thin membrane-like windows for the reason that these foams are relatively non-porous and while they would be effective in precluding passage of rain, snow and other items, would similarly restrict passage of air to a point where its use as a ventilator would not be warranted. Matted fiber structures are objectionable for the same reason and additionally have lower strength characteristics.

From the foregoing it will be apparent that the present invention provides a novel improvement in ventilators wherein the advantages of a filter and a ventilator are combined in a simply constructed and economical device. For example, the finger frame required for a ventilator section may be simultaneously manufactured from a flat continuous sheet of a light weight material, as for example aluminum, in a single operation wherein the fingers of each frame are formed in staggered and opposing relationship. Thereafter the channels may be formed and the section assembled quickly and easily.

While a particular embodiment of the present invention has been illustrated and described herein, it is not intended to limit the invention specifically to such a disclosure and changes and modifications may be incorporated and embodied there in within the scope of the following claims.

I claim:
1. In a ventilator, a frame including a plurality of interconnected frame members, a first U-shaped channel member mounted in said frame contiguous to and parallel with a first of said frame members, the open face of said channel member facing an opposing second of said frame members, a plurality of spaced parallel fingers integrally formed as extensions of a side wall of said U-shaped channel, a second channel member similar to said first channel mounted in said frame contiguous and parallel to said opposing second frame member, the fingers of said first and second channel members extending in reverse opposing relation from said channel members, the free ends of said fingers of each channel member extending between and constrained by the side walls of the opposing channel member, and a filter consisting of a skeletonized polymeric foam inserted intermediate the channel members and resiliently held and supported by and between the coacting finger portions.

2. In a ventilator comprising a pair of generally rectangular frames including a plurality of interconnected frame members, track members on said frames consisting of angularly disposed coacting surfaces adapted to interconnect said frames for longitudinal movement with respect to each other, a first U-shaped channel member mounted in each said frame contiguous to and parallel with a first of said frame members thereof, the open face of said channel member facing an opposing second frame member of said frame, the walls of said channel terminating in inwardly extending flange portions, a plurality of spaced parallel fingers formed integrally with said channel member as extensions of a side wall thereof, a second channel member similar to said first channel member positioned in each said frame contiguous to and parallel with said opposing second frame member thereof, the fingers of said first and second channel members extending in reverse opposing relation from said channel members, the free ends of said fingers of each channel member extending between the side walls of the other channel member in engagement with a flange portion thereof, and a filter consisting of a skeletonized polymeric foam resiliently held and supported by and between the coacting finger portions.

3. In a ventilator, a frame including a plurality of interconnected frame members, a first U-shaped channel member mounted in said frame contiguous to and parallel with a first of said frame members, the open face of said channel member facing an opposing second of said frame members, a plurality of spaced parallel fingers integrally formed as extensions of a side wall of said U-shaped channel, a second channel member similar to said first channel mounted in said frame contiguous and parallel to said opposing second frame member, the fingers of said first and second channel members extending in reverse opposing relation from said channel members, the free ends of said fingers of each channel member extending between and constrained by the side walls of the opposing channel member, and a filter consisting of a resilient filter material inserted intermediate the channel members and resiliently held and supported by and between the coacting finger portions.

References Cited in the file of this patent
UNITED STATES PATENTS

| | | |
|---|---|---|
| 2,665,627 | Fager | Jan. 12, 1954 |
| 2,754,928 | Hambrecht et al. | July 17, 1956 |
| 2,770,241 | Winkler | Nov. 13, 1956 |
| 2,926,389 | Garlington | Mar. 1, 1960 |